Dec. 1, 1953 G. R. BURKHARDT Re. 23,745
RAILWAY RAIL
Original Filed April 9, 1942
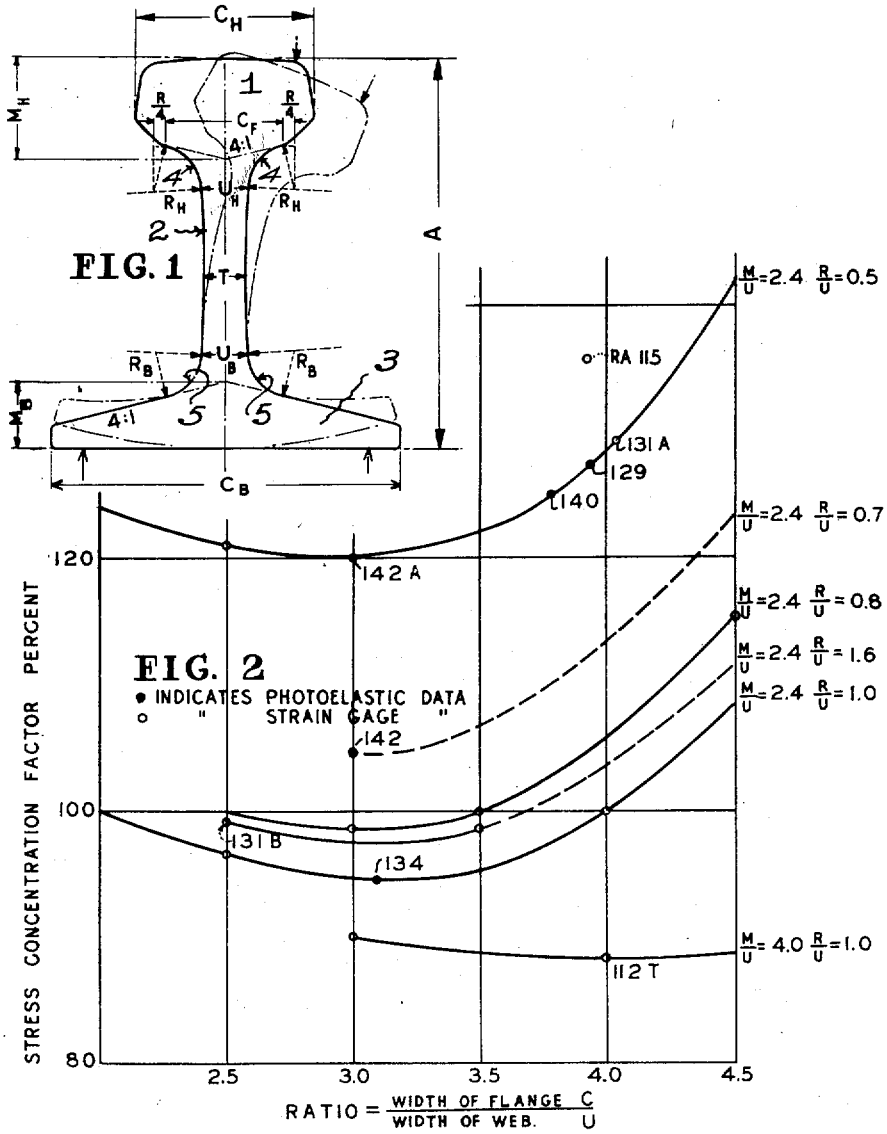
INVENTOR
GEO. R. BURKHARDT
BY
ATTY

UNITED STATES PATENT OFFICE 23,745

RAILWAY RAIL

George R. Burkhardt, Chicago, Ill.

Original No. 2,577,601, dated December 4, 1951, Serial No. 568,309, December 15, 1944. Application for reissue January 10, 1952, Serial No. 265,870

9 Claims. (Cl. 238—125)

Matter enclosed in heavy brackets [ ] appears in the original patent but forms no part of this reissue specification; matter printed in italics indicates the additions made by reissue.

This case is a continuation in part of my pending application, Serial No. 438,311, now abandoned, filed April 9, 1942, and relates to railway rails of the Vignoles type, i. e., rails which are of substantially T-shape in cross section, and has particular reference to an improved distribution of metal in such rails, for the purpose of reducing stress concentrations therein, particularly in and about the head-web and base web fillets thereof where, according to prior rail designs, undesirable high and dangerous stress concentrations have occurred.

Stress concentration in and about the head-web and the base-web fillets of T-rails causes fatigue of metal in these locations and are conducive to split heads, cracked webs, and other types of rail failures. In this connection, the A. R. E. A. formulae for stresses in railway rails (page 886, A. R. E. A., volume 19) are based on the assumption that the stress is distributed according to the law that it increases directly as the distance from the neutral axis. However, the abrupt changes occurring in T-rail sections results in discontinuity in the distribution of stress. Accordingly, the said A. R. E. A. formulae for calculating stress in rails is, in many cases, not even a rough approximation of the maximum stress concentrated in the head-web and the base-web fillets of a dynamically loaded rail. In other words, rail design practices heretofore in vogue do not take into consideration all of the factors essential for reduction in stress concentration in and about the head-web and the base-web fillets of T-rail in that they do not sufficiently consider the relationship of the distribution of metal in the web at its junction with the head and the base of the rail as well as the relation of the width and depth of the head to the width of the web. These facts teach the necessity of a more fundamental study of the stress conditions in the junctures of head and web, and web with base. To this end, extensive studies have been made which would establish the effect of proportions of the head, web and fillets of the rail section on the resulting stress concentrations. The study of the effect of these proportions was made from the measurements of strains in the rail as shown by two dimensional photoelastic and strain gage tests on rails and from membrane analogy. Tests were made on models with vertical loads applied accentrically to the head. The base of the rail was uniformly supported in some cases and in other cases the base was supported only at the edges to simulate the conditions resulting from the usual concave tie plate. Investigation was made of the stress in models in which the ratio depth of flange to width of web was kept constant and the ratios of width of head to width of web, and ratio of radius of fillet to width of web varied. Investigation was also made of the effect of deep flanges.

Therefore, the primary object of the present invention is to provide a T-rail having an economical and efficient metal distribution involving a novel ratio of width-of-web at the junction of the head-web and the base-web fillets therewith to the radii of said head-web and base-web fillets, combined with a width and depth of the head, such that high and dangerous stress concentrations in and about the head-web and the base-web fillets and throughout the rail are avoided. That is to say, while the stress concentration factor is the ratio between the stress in the fillet and the stress in the web, this factor in a shape such as a rail, where the change in shape from web to head and web to base is rapid, is a simultaneous function of the ratio width and depth of head to width of web combined with a novel radius of fillet to width of web ratio, and these ratios are critical in mutually producing a safe and efficient rail.

According to the present invention, the radii of the head-web fillets are substantially equal to the width of the web at the juncture of the head and the web. In other words, the head-web fillets of a rail produced in accordance with the present invention have considerably longer radii than the head-web fillets of rails produced in accordance with prior practice. As a consequence, wide bearing areas are afforded to be engaged by the heads of splice bars of the Headfree type and these wide bearing areas are conducive to longer life and more satisfactory performance generally of Headfree joints if the latter are employed to connect the present rails. Thus, rails produced in accordance with the present invention are specially adapted for advantageous connection by Headfree joints.

With the foregoing and other objects in view, which will more readily appear to those familiar with the art, as the invention is better understood, the same consists in the novel metal distribution and proportion of parts hereinafter more fully described, illustrated in the accompanying drawings, and defined in the appended claims.

In the accompanying drawings:

Figure 1 is an end elevation of a rail, in full lines, having its metal distributed in accordance with the present invention while the broken lines show the distortion resulting from loading the rail in the manner described.

Figure 2 is a chart showing a series of graphs indicating the results of studies of different rail sections, and teaches the ideal ratios between radius of fillets and the width of web and ratios of width of head to width of web at the juncture with the fillets.

Referring to the drawings in detail, it will be observed from Figure 1 that the present rail is of the Vignoles or T-type and comprises, as usual, a head 1, web 2, base 3 and head-web and base-web fillets 4 and 5, respectively, at the junctures of the head and the base with the web. Also, dimension lines with reference letters are shown to describe the ideal proportion of the metal distribution of the present invention.

Generally the letter C has been used to designate the width of flanges, treating the head 1 as well as the base 3 as such, and likewise R and U are used in the equations to designate the radii of the fillets and width of web at the juncture of the fillets therewith respectively, so that the graphs of Fig. 2 will apply equally to the head or the base and M generally designates the depth of the flanges. However, as will be seen from the drawing, an appropriate subscript is used in each case to designate the specific flange, radius or web thickness. For example, $C_H$ designates the width of the head and $C_B$ designates the width of the base, while the radii of the head fillets 4 and base fillets 5 are respectively designated as $R_H$ and $R_B$, and the width of the web 2 at the junction of said fillets with the web is also respectively designated as $U_H$ and $U_B$. The depth of the head 1 is indicated as $M_H$ and the depth of the base is shown by the reference $M_B$. Also the width of the head along the top line of the fishing is designated as $C_F$.

The outer sides of the web 2 are each of a substantially flat concave curvature as conventional in rails of the Vignoles type and the point of minimum thickness of the web is between the head fillets and base fillets along a horizontal line passing through the center of curvature of the arcs of greatest radii of the web on opposite sides of the vertical center line of the cross section of the rail. For example, in Fig. 1, the dimension T represents the minimum width of the web, and the dimensions $U_H$ and $U_B$ represent the maximum width of the web. The ratio of T to overall rail heights is empirically determined.

As previously indicated, the present invention relates to a new distribution of metal in the web, head and base of the rail where the factors to be considered are the relationship of the width and depth of the head to the width of the web and the radii of the fillets to width of web. The graphs show that these ratios simultaneously affect the stress concentration factor.

Referring first to the feature of the radii of the fillets 4 and 5 joining the web 2 to the head 1 and the web 2 to the base 3 of the rail and assuming, for example, that $R_H$ and $R_B$ are the radii of the fillets, and $U_H$ and $U_B$ are respectively the thickness of the web at the junction with the head and base fillets, it has been found that stress concentration in said fillets increases with decrease of the ratio $$\frac{R_H}{U_H} \text{ or } \frac{R_B}{U_B}$$

below one or unity and also increases again with increase of said ratio above one or unity. In other words, it has been found that stress concentration in said fillets decreases rapidly to a minimum when $$\frac{R}{U}=\text{one}$$

and remains substantially a minimum within a range of said ratio of not less than .8 nor more than 1.6.

Accordingly, the ratio of the radius $R_H$ to the width $U_H$ in the present rail is substantially unity or within the range stated, and likewise, the ratio of the radius $R_B$ to the width $U_B$ of the web is substantially equal to unity or within the range stated. The graphs show that the stress concentration factor is lowest when $$\frac{R}{U}=1.0$$

and that $$\frac{R}{U}=0.8 \text{ and } \frac{R}{U}=1.6$$

are the desirable limits to be placed on this ratio. The ratio of $$\frac{R}{U}=1.0$$

is made because the stress concentration factor is lowest at this point. The graphs show a substantial equality in the stress concentration factor between the ratio $$\frac{R}{U}=0.8,\ \frac{R}{U}=1.0 \text{ and } \frac{R}{U}=1.6$$

It is to be noted that there is a sharp increase in the stress concentration factor for the ratio $$\frac{R}{U}=0.7$$

In other words, 0.8 is just below the knee of the curve which is substantially horizontal between 0.8 and 1.6. At the point where the ratio of $$\frac{R}{U}=1.6$$

the curves again turn upward at an increased rate.

Referring now to the width $C_H$ of the head 1 and the width of the base $C_B$ in relation to the width $U_H$ or $U_B$ of the web and the radii $R_H$ and $R_B$ of the fillets, my studies of rail stress by membrane analogy show that stress concentration increases rapidly when the ratio of width of head C to width U of web exceeds four, and likewise stress concentration increases again when the width C of the head is less than two and one-half times the width U of the web 2. As shown in Figure 1, the overall height of the rail is designated as A which is not more than 1¼ times and not less than the width $C_B$ of the base to provide against overturning by the resultant of vertical and lateral loads and being greater than the width $C_B$ of the base section which is not less than twice the width $C_H$ of the head section 1.

In Figure 2—

The line marked $$\frac{M}{U}=2.4\frac{R}{U}=0.5$$

contains points obtained by investigating the old type rails, for example, the A. R. E. A. 112 lb. sections and modifications thereof such as reducing the width of the head.

The dotted line, marked $$\frac{M}{U}=2.4 \text{ and } \frac{R}{U}=0.7$$

shows the effect of increasing the ratio of radius of head-web fillet to width of web and maintaining the same ratio of depth of head to width of web found in the first line.

The line marked $$\frac{M}{U}=2.4, \frac{R}{U}=0.8$$

and $$\frac{M}{U}=2.4 \text{ and } \frac{R}{U}=1.6$$

was drawn through points obtained from measurements of rails strained as shown in Fig. 1. The line marked $$\frac{M}{U}=2.4 \text{ and } \frac{R}{U}=1.0$$

shows that lowest stress concentration factor results from equality between the thickness of the web and radius of fillet.

The line marked $$\frac{M}{U}=4.0 \text{ and } \frac{R}{U}=1.0$$

is substantially horizontal because the bending of the flanges is negligible when $$\frac{M}{U}=4$$

My analysis of stress in railway rail with curved webs shows that the shearing stress in the web increases inversely as the radius of the curves. Also, when a fillet radius is employed equal to the width of web at the point of compounding, stress concentration is a minimum. Furthermore, my analysis demonstrates that the transition of the stress from web to head is less critical when the radius of the fillet equals the width of the web.

My experience with failed rails, particularly failure in the base, shows that concave tie plates and convex rail bases cause the type of bending in the base shown in Figure 1. Accordingly, it is important that the radius of the fillet $R_B$ is not less than 0.8 times the depth of the base at the juncture or point of tangency with the fillet. Also the radius of fillet should not be more than 1.6 times the depth of base. The ideal ratio is of course 1.0 so that at the point of tangency with fillet the width of web should equal the depth of base.

Thus, the graphs of Figure 2 teach the ideal ratios between radius of fillets and the width of web and ratio of width of head to width of web of the juncture with the fillet. The several illustrations given definitely show that these ratios simultaneously affect the stress concentration factor. The maximum stress, $\sigma$ max, occurring in the fillet joining head and web and web and base can be expressed as a multiple of the nominal stress, $\sigma$ nom, in the web. Thus $\sigma \text{ max} \equiv k\sigma \text{ nom}$ where k is the stress concentration factor.

The studies undertaken showed that the following factors contribute to an increase in the max stress, $\sigma$ max.

With respect to the relation of the point of load to fillets, i. e., the ratio of width of flange to width of web, as shown in the graphs, the straight edge of the cross section opposite the fillet results in a slight increase in the stress concentration factor, when $$\frac{C}{U}$$

is less than 3 and a substantial increase when $$\frac{C}{U}$$

is greater than 4.0. Tests by membrane analogy show that the maximum shearing stress occurs about at the center of the fillet and that there is a notable increase in stress from the point where the fillet is tangent to the flange to a point in the center of the fillet.

As to the ratio of the depth of flange M to width of web U, the graphs show that the stress concentration becomes smaller with an increase in the ratio $$\frac{M}{U}$$

The ratio $$\frac{M}{U}$$

is the ratio between maximum depth of head and minimum width of web. When $$\frac{M}{U}=2.4$$

or less then bending of flanges is a factor in the strain. The minimum lower limit of $$\frac{M}{U}$$

is 2.0 to prevent the stress resulting from bending of the flanges of the head from exceeding the endurance of rail steel. In Figure 1 the depth of head $M_H$ is shown as twice the thickness of the web at the juncture of the head-web fillets therewith as illustrated by $U_H$. Thus, according to the drawing, the lowest limit of the ratio $$\frac{M_H}{U_H}=2.0$$

When $$\frac{M}{U}=4$$

this bending can be disregarded. The stress concentration, then, increases as the ratio $$\frac{M}{U}$$

decreases assuming that $$\frac{R}{U}$$

is kept constant.

The solid lines in the graph were drawn when three or more points were obtained from test data. The dotted lines were drawn when only one or two points could be obtained from test data. The solid dots indicate points confirmed by photoelastic exhibits. The open dots indicate points obtained from test measurments. The numerals assigned to the points are the test or exhibit numbers. Points RA115 is the result of tests on a rail having the following proportions:

$$\frac{R_H}{U_H}=0.4, \frac{C_H}{U_H}=3.9, \frac{M_H}{U_H}=2.4$$

Tests have [been] shown that the shapes of the curves or graphs are similar when the stress concentration factor is platted as a function of the ratios $$\frac{C}{U}, \frac{M}{U} \text{ or } \frac{R}{U}$$

In a rail this factor is a simultaneous function of all of these ratios both in the head and base. The most important ratios in the rail are $$\frac{R}{U}$$

coupled with $$\frac{C_H}{U_H} \text{ and } \frac{C_B}{U_B}$$

The most economical and satisfactory metal distribution results from making $$\frac{R}{U}$$

not less than 0.8 nor more than 1.6 and at the same time making $$\frac{C_H}{U_H} \text{ and } \frac{C_B}{U_B}$$

not more than 4.0

As to the feature of providing increased bearing area between the underside of a Headfree rail at the location of the fillets 4 and the top bearing surface of a Headfree joint bar, it may be pointed out that in the Headfree type rail, the width of the head at the top of the fishing may be defined in terms of the width of the web at the juncture with the head-web fillets. If R=U then the width $C_F$ of the head along the top line of the fishing equals $$C_F = 3U - \frac{U}{2} = \frac{5U}{2} = 2\tfrac{1}{2}U \text{ approx.}$$

As shown in Fig. 1, the improved metal distribution described provides for an increased bearing for the head of the joint bars, and also maintains in the improved Headfree type rail, the desirable functional phase of the standard comparable Headfree rail.

I claim:

1. A Vignoles type rail having a head section, a base section, a web section, head-web fillets and base-web fillets, the sides of said web section being of a substantially flat concave curvature, the point of minimum width of said web lying between the point of tangency of the head-web and base-web fillets with the web and being along a horizontal line passing through the center of curvature of the arcs of greatest radii of the web on opposite sides of the vertical center line of the cross section of the rail, the width of the web at the juncture with the head-web and base-web fillets being not less than said minimum width, the radius of each of said fillets being not more than 1.6 and not less than 0.8 times the width of the web at its juncture with the fillets, said head section at its thickest point having a depth of not more than 4 and not less than 2.4 times the width of the web at the juncture of web and head-web fillets, the maximum width of said head being not more than 4 times and not less than 2.5 times the width of the web at the juncture of the web and head-web fillets, the overall height of the rail being not more than 13 times the minimum width of web, not more than 1¼ times and not less than the width of the base to provide against overturning by the resultant of vertical and lateral loads and being greater than the width of the base section which is not less than twice the width of the head section.

2. A Vignoles type rail according to claim 1 wherein the radii of the fillets are equal to the width of the web at the point of tangency of said fillets with said web.

3. A Vignoles type rail construction according to claim 1 wherein the depth of the base section at the point of tangency of the base-web fillets therewith is not less than 0.8 or more than 1.6 times the radius of the base-web fillets.

4. A Vignoles type rail construction according to claim 1 wherein the depth of the base at the point of tangency of the base-web fillets therewith is equal to the radius of the base-web fillets.

5. A Vignoles type rail having a head section, a base section, a web section, head-web fillets and base-web fillets, the sides of said web section being of a substantially flat concave curvature, the point of minimum width of said web lying between the point of tangency of the head-web and base-web fillets with the web and being along a horizontal line passing through the center of curvature of the arcs of greatest radii of the web on opposite sides of the vertical center line of the cross section of the rail, the width of the web at the juncture with the head-web and base-web fillets being not less than said minimum width, the radius of each of said fillets being not more than 1.6 and not less than 0.8 times the width of the web at its juncture with the fillets, said head section at its thickest point having a depth of not more than 4 and not less than 2.0 times the width of the web at the juncture of web and head-web fillets, the maximum width of said head being not more than 4 times and not less than 2.5 times the width of the web at the juncture of the web and head-web fillets.

*6. A Vignoles type rail having a head section, a base section, a web section, head-web fillets and base-web fillets, the sides of said web section being of a substantially flat concave curvature, the point of minimum width of said web lying between the point of tangency of the head-web and base-web fillets with the web and being along a horizontal line passing through the center of curvature of the arcs of greatest radii of the web on opposite sides of the vertical center line of the cross section of the rail, the width of the web at the juncture with the head-web and base-web fillets being not less than said minimum width, the radius (of each) of said head-web fillets being not more than 1.6 and not less than 0.8 times the width of the web at its juncture with the head-web fillets, the depth of the base section at the point of tangency of the base-web fillets therewith being not less than 0.8 or more than 1.6 times the radius of the base-web fillets, and said head section at its thickest point having a depth of not more than 4 and not less than 2.0 times the width of the web at the juncture of web and head-web fillets, the maximum width of said head being not more than 4 times and not less than 2.5 times the width of the web at the juncture of the web and head-web fillets.*

*7. A Vignoles type rail having a head section, a base section, a web section, head-web fillets and base-web fillets, the sides of said web section being of a substantially flat concave curvature, the point of minimum width of said web lying between the point of tangency of the head-web and base-web fillets with the web and being*

*along a horizontal line passing through the center of curvature of the arcs of greatest radii of the web on opposite sides of the vertical center line of the cross section of the rail, the width of the web at the juncture with the head-web (and base-web) fillets being not less than said minimum width, the radius (of each) of said fillets being not more than 1.6 and not less than 0.8 times the width of the web at its juncture with the fillets, said head section at its thickest point having a depth of not more than 4 and not less than 2.0 times the width of the web at the juncture of web and head-web fillets, the maximum width of said head being not more than 4 times and not less than 2.5 times the width of the web at the juncture of the web and head-web fillets, the width of the web at the juncture with the base-web fillets being not less than said minimum width, the radii of the base-web fillets being not more than 0.8 and not less than 0.5 times the width of the web at the juncture with said base-web fillets.*

*8. A Vignoles type rail having a head section, a base section, a web section, head-web fillets and base-web fillets, the sides of said web section being of a substantially flat concave curvature, the point of minimum width of said web lying between the point of tangency of the head-web and base-web fillets with the web and being along a horizontal line passing through the center of curvature of the arcs of greatest radii of the web on opposite sides of the vertical center line of the cross section of the rail, the width of the web at the juncture with the head-web and base-web fillets being not less than said minimum width, the radius (of each) of said head-web fillets being not more than 1.6 and not less than 0.8 times the width of the web at its juncture with the head-web fillets, the depth of the base section at the point of tangency of the base-web fillets therewith being not less than 0.8 or more than 1.6 times the radius of the base-web fillets, and said head section at its thickest point having a depth of not more than 4 and not less than 2.0 times the width of the web at the juncture of web and head-web fillets, the maximum width of said head being not more than 4 times and not less than 2.5 times the width of the web at the juncture of the web and head-web fillets, the width of the web at the juncture with the base-web fillets being not less than said minimum width, the radii of the base-web fillets being not more than 0.8 and not less than 0.5 times the width of the web at the juncture with said base-web fillets.*

*9. A Vignoles type rail having a head section, a base section, a web section, head-web fillets and base-web fillets, the sides of said web section being of a substantially flat concave curvature, the point of minimum width of said web lying between the point of tangency of the head-web and base-web fillets with the web and being along a horizontal line passing through the center of curvature of the arcs of greatest radii of the web on opposite sides of the vertical center line of the cross section of the rail, the width of the web at the juncture with the head-web (and base-web) fillets being not less than said minimum width, the radius (of each) of said fillets being substantially equal to the width of the web at its juncture with the fillets, said head section at its thickest point having a depth of not more than 4 and not less than 2.0 times the width of the web at the juncture of web and head-web fillets, the maximum width of said head being not more than 4 times and not less than 2.5 times the width of the web at the juncture of the web and head-web fillets, the width of the web of the juncture with the base-web fillets being not less than said minimum width, the radii of the base-web fillets being not more than 0.8 and not less than 0.5 times the width of the web at the juncture with said base-web fillets.*

GEORGE R. BURKHARDT.

References Cited in the file of this patent or the original patent

UNITED STATES PATENTS

| Number | Name | Date |
|---|---|---|
| 2,260,211 | Burkhardt | Oct. 21, 1941 |

FOREIGN PATENTS

| Number | Country | Date |
|---|---|---|
| 1,856 | Great Britain | May 20, 1875 |

OTHER REFERENCES

"Stress Concentration Produced by Holes and Fillets," by S. Timoshenko and W. Dietz, American Society Mechanical Engineers, Transactions 1925, page 212, section 35 et seq.

"Torsion in Structural Beams," by F. L. Ehasz, Lawrence Calvin Brink, Research Fellow in Civil Engineering, Lehigh University.

Railway Age, December 12, 1942, pp. 963–967, vol. 113, No. 24.

Steel Rails, by William Sellew. Plate No. XVII, deposited in the U. S. Patent Office Library June 26, 1941, printed in 1913 by Van Nostrang Co. of New York.